US012457193B2

United States Patent
O'Connell et al.

(10) Patent No.: US 12,457,193 B2
(45) Date of Patent: Oct. 28, 2025

(54) SYSTEMS AND METHODS IMPLEMENTING NAME RESOLUTION AND VIRTUAL ADDRESSES TO ENABLE NETWORK CONNECTIONS

(71) Applicant: Gen Digital Inc., Tempe, AZ (US)

(72) Inventors: Christopher Joseph O'Connell, Tuscon, AZ (US); Barna Csukas, Miercurea Ciuc (RO); Gabor Miklos, Miercurea Ciuc (RO)

(73) Assignee: Gen Digital Inc., Tempe, AZ (US)

( * ) Notice: Subject to any disclaimer, the term of this patent is extended or adjusted under 35 U.S.C. 154(b) by 0 days.

(21) Appl. No.: 18/420,280

(22) Filed: Jan. 23, 2024

(65) Prior Publication Data

US 2025/0240266 A1 Jul. 24, 2025

(51) Int. Cl.
*H04L 61/4511* (2022.01)
*H04L 9/40* (2022.01)
*H04L 12/46* (2006.01)
*H04L 45/42* (2022.01)
*H04L 61/5007* (2022.01)

(52) U.S. Cl.
CPC ...... *H04L 61/5007* (2022.05); *H04L 61/4511* (2022.05)

(58) Field of Classification Search
CPC . H04L 61/5007; H04L 61/4511; H04L 12/46; H04L 9/40; H04L 45/42; H04L 45/586
USPC ........................................................ 709/245
See application file for complete search history.

(56) References Cited

U.S. PATENT DOCUMENTS

| | | | |
|---|---|---|---|
| 11,190,491 B1 * | 11/2021 | Kaciulis | H04L 63/029 |
| 11,689,421 B2 * | 6/2023 | Vanajakshi | H04L 43/0852 |
| | | | 709/220 |
| 11,991,044 B2 * | 5/2024 | Talanis | G06N 20/00 |
| 12,120,087 B2 * | 10/2024 | Baltrenas | H04L 12/4633 |
| 2017/0353331 A1 | 12/2017 | Lapidous et al. | |
| 2019/0007365 A1 * | 1/2019 | Dan | G06N 20/00 |
| 2022/0210130 A1 * | 6/2022 | Kaciulis | H04L 69/14 |
| 2024/0098068 A1 * | 3/2024 | Pabijanskas | H04L 12/4633 |

FOREIGN PATENT DOCUMENTS

EP 3754949 A1 12/2020

OTHER PUBLICATIONS

"Forward-confirmed Reverse DNS" Wikipedia, The Free Encyclopedia, Oct. 24, 2023, wikipedia.org/w/index . . . php?title=Forward-confirmed_reverse_DNS&oldid=23847058. Retrieved on Apr. 8, 2025.
EP Patent Application No. 25153362.6, filed Jan. 22, 2025.
Extended EP Search Report dated May 15, 2025 for European Patent Application No. 25153362.6.
"Forward-confirmed Reverse DNS" Wikipedia, The Free Encyclopedia, Oct. 24, 2023, wikipedia.org/w/index . . . php?title=Forward-confirmed_reverse_DNS&oldid=23847058. (machine translation). Retrieved on Apr. 8, 2025.

* cited by examiner

*Primary Examiner* — Jude Jean Gilles
(74) *Attorney, Agent, or Firm* — Dovas Law, P.C.

(57) ABSTRACT

Systems for performing methods which include receiving by a VPN server, from a VPN client operating on a computing device, over a VPN connection a first message including a first IP address. The VPN server determines a hostname based on the first IP address, resolves the hostname to a second IP address, and transmits the first message to a network device at the second IP address.

16 Claims, 5 Drawing Sheets

SYSTEMS AND METHODS IMPLEMENTING NAME RESOLUTION AND VIRTUAL ADDRESSES TO ENABLE NETWORK CONNECTIONS

FIELD OF INVENTION

The invention relates generally to network communication, and more particularly to name resolution enabling network connections.

BACKGROUND

Hostname resolution involves converting a hostname (e.g., "www.example.com") of a network accessible device to an internet protocol ("IP") address of the device to enable communication network communication with the device. A virtual private network ("VPN") is a system that creates a secure data connection between a device and a network or between networks. For a computing device operating in a VPN, one or more steps of the hostname resolution process may occur outside of the VPN.

VPNs started out primarily as a means of extending internal corporate and organizational networks between locations. Over time VPNs became a method of allowing dispersed devices (such as laptops and mobile phones) to connect to corporate networks. During these developments, VPNs were in many ways a necessary element of the network design, and were often seen as a necessary evil, reducing speed but in exchange for allowing a geographically diverse operation. More recently, VPNs have become a consumer product. In their marketing and operation, they have moved from an organizational necessity to a desirable end user safety feature. As part of this shift there has been a significant focus on speed and performance. Indeed, in many cases VPNs now serve as much as a network accelerator as they do as a security service.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A first network connection method is provided. The first network connection method includes receiving by a VPN server, from a VPN client operating on a computing device, over a VPN connection a first message including a first IP address. The first network connection method further includes determining by the VPN server a hostname based on the first IP address, resolving by the VPN server the hostname to a second IP address, and transmitting by the VPN server the first message to a network device at the second IP address.

A second network connection method is provided. The second network connection method includes receiving by a first computing system a hostname and assigning by the first computing system a first IP address to the hostname based on the hostname or a portion of the hostname. The first computing system transmits over a network a message including the first IP address to a second computing system. The second computing system receives from the first computing system the message including the first IP address. The second computing system determines the hostname based on the first IP address. The second computing system resolves the hostname to a second IP address, and the second computing system transmits the message to a third computing system at the second IP address.

A computing system is provided. The computing system includes one or more processors and memory storing executable instructions that, as a result of being executed, cause the system to perform operations including receiving from a VPN client operating on a computing device over a VPN connection a first message including a first IP address. The operations further include determining a hostname based on the first IP address, resolving the hostname to a second IP address, and transmitting the first message to a network device at the second IP address.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENTS

Figure 1:
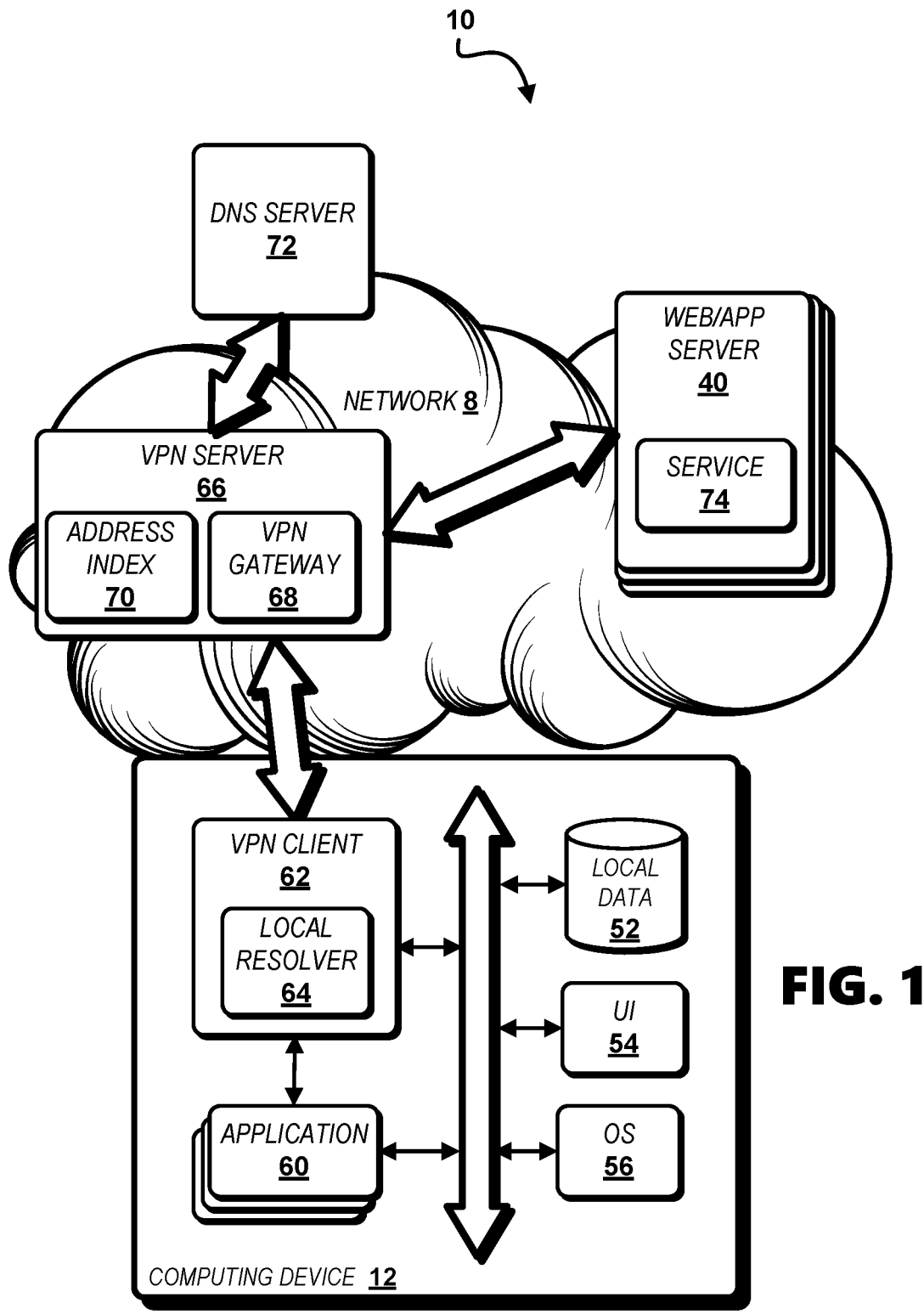
FIG. 1 shows an environment in which a network-connectable processor-enabled virtual private network ("VPN") server facilitates secure data transmission between a computing device and other systems in a computer network.

The core network feature of name resolution remains a significant bottleneck in achieving a performant virtual private network ("VPN") service. Since name resolution requires a round trip to a distant server, a signal must traverse the entire VPN tunnel and the public internet before any further progress can be made in the overall connection the user is creating over the VPN. Solutions such as running a domain name system ("DNS") resolver proximate to the VPN gateway or running a local resolver on the user's device do not solve the fundamental issue that at least one DNS lookup must be made over the VPN tunnel. Regardless of which conventional method is chosen, name resolution must occur over the VPN tunnel, either between a stub resolver and its upstream resolver/server or between a client and a resolver located at a gateway. In the alternative, running a DNS resolver outside the VPN tunnel may improve speed but at a terrible cost to security; ramifications range from leaking browsing intents to the potential for phishing and other security breaches. Described herein are solutions to the problems of domain name resolution which solutions include splitting and deferring the domain name resolution deep into the network. Rather than merely relocating the DNS server, novel connection negotiations are implemented, allowing the establishment of a connection to proceed before name resolution has occurred. By allowing a connection to proceed without completing name resolution, the long traverse of name resolution between the client and the gateway is removed, allowing the client to connect without DNS resolution. In addition to increased connection speed and performance, herein described systems and processes provide the benefit of significantly reducing the portion of the public internet through which insecure name resolution data must traverse thereby reducing the security perimeter of the name resolution. The systems and processes described herein make unique use of the numerical possibilities of internet protocol ("IP") addresses to encode domain names and to change the Transmission Control Protocol ("TCP") and User Datagram Protocol ("UDP") connection setup processes to significantly move the cost of DNS resolution from a VPN client to a VPN server.

Terms set forth herein have the following meanings:

A "hostname" is a fully qualified domain name ("FQDN"), for example "www.example.com" including a domain name, for example "example.com".

A "VPN server" is network-connectable physical or virtualized computing system configured to establish a VPN connection over a network with a VPN client. A VPN server may provide various levels of encryption. Without a loss of generality, the described embodiments apply to any virtualized network service, regardless of specific encryption features, and a VPN server as described herein need not implement encryption.

A "VPN client" is an application operating on a computing device configured to establish a VPN connection over a network with a VPN server or a plurality of VPN servers.

As described herein, reference to "first," "second," and "third," components (e.g., a "first internet protocol ('IP') address," a "second IP address") is not used to show a serial or numerical limitation or a limitation of quality but instead is used to distinguish or identify the various components.

Referring to FIG. 1, an environment 10 enabled by a computer network 8 is illustrated in which a network-connectable processor-enabled virtual private network ("VPN") server 66 is provided that facilitates secure data transmission between a computing device 12 and other systems in the computer network 8. The computer network 8 includes one or more wired or wireless networks or a combination thereof, for example a local area network ("LAN"), a wide area network ("WAN"), the internet, mobile telephone networks, and wireless data networks such as Wi-Fi™ and 3G/4G/5G cellular networks. An application including a VPN client 62 executed on the computing device 12 engages with other applications 60 executed on the computing device 12. An application 60 includes for example an internet browser, an email client, a messaging client, a social networking application, or other network-connectable client application. An operating system ("OS") 56 is executed on the computing device 12 which enables integration of the application 60 and the VPN client 62. The VPN client 62 can be provided integral with or as an extension, plugin, or add-on to one or more applications 60 executed on the computing device 12 and provides notices to a user via a user interface 54. The VPN client 62 executed on the computing device 12 establishes a secure VPN connection between an application 60 and the VPN server 66.

Web or application ("web/app") servers 40 operated by various entities can provide services to enable the applications 60 or components of the applications 60. The web/app servers 40 can further enable online services including network-based applications, webpages, electronic message provider systems (e.g., email provider systems), or other online services accessible via an application 60. A user is enabled to engage an online service enabled by a web/app server 40 for example by accessing a webpage or accessing a webpage and registering a user account for which account credentials (e.g., username, password) are created by the user or by an administrator of the online service.

Figure 2:
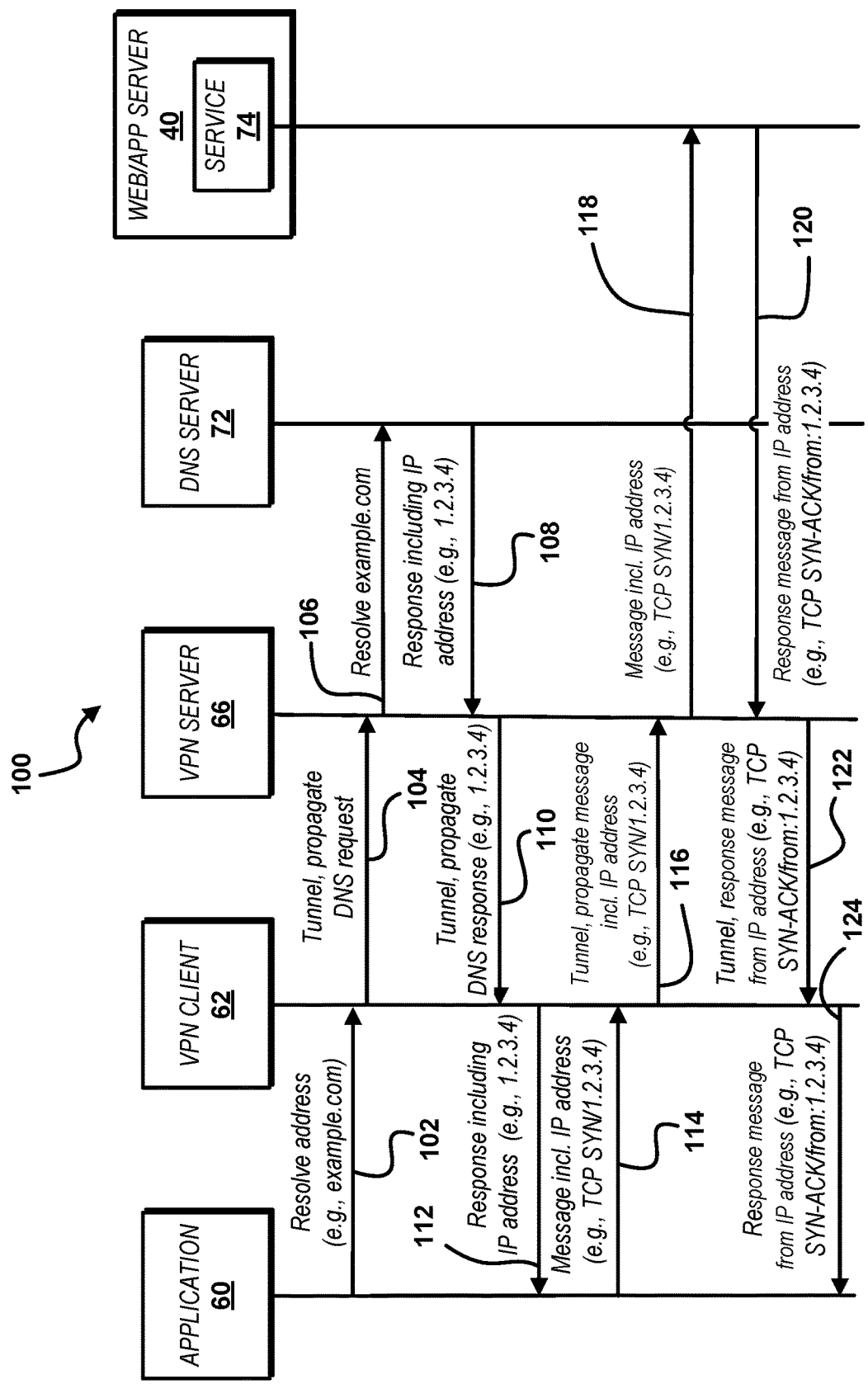
FIG. 2 shows a conventional network connection process over a VPN.

Referring to FIG. 2, a conventional network connection process 100 is shown. The process 100 is described with reference to the transmission control protocol ("TCP") communication standard and to the components of the environment 10 including the computing device 12, the application 60, the VPN client 62, the VPN server 66, a DNS server 72, a web/app server 40, and a service 74. Alternatively, the process 100 can be performed via other systems and is not restricted to being implemented by the components of the environment 10 or to being implemented as a TCP connection process. For example, the network connection process 100 can support the user datagram protocol (UDP) communication standard.

In a step 102, the application 60, for example an internet browser, transmits a request to resolve a hostname (e.g., www.example.com) to the VPN client 62. The VPN client 62 propagates a DNS request via a VPN tunnel to the VPN server 66 (step 104) which attempts to resolve the hostname via a DNS request to the DNS server 72 (step 106). In a step 108, the VPN server 66 receives a response from the DNS server 72 including an IP address (e.g., 1.2.3.4). The VPN server 66 propagates the DNS response including the IP address (e.g., 1.2.3.4) via the VPN tunnel to the VPN client 62 (step 110), and the VPN client 62 forwards the IP address to the application 60 (step 112).

In a step 114, the application 60 requests a connection to a service 74 (e.g., a webpage) hosted on a web/app server 40 at the IP address by transmitting a message. In the case of a TCP connection, the request for connection is initiated by transmitting a synchronize ("SYN") message to the VPN client 62 including a sequence number for packets originating from the application 60. The VPN client 62 propagates the request, including the message, a SYN message in the case of a TCP connection, to the VPN server 66 through the VPN tunnel (step 116). The VPN server 66 transmits the message (e.g., a TCP SYN message) to the web/app server 40 hosting the service 74 at the IP address (e.g., 1.2.3.4) (step 118). In a step 120, the VPN server 66 receives a response from the web/app server 40, which in the case of a TCP connection includes a synchronize acknowledge ("SYN-ACK") message including an acknowledgement of the sequence number from the VPN server 66 and including another sequence number for packets originating from the web/app server 40. The VPN server 66 transmits the message from the web/app server 40 (e.g., the SYN-ACK message) through the VPN tunnel to the VPN client 62 (step 122). The VPN client 62 transmits the message from the web/app server 40 (e.g., the SYN-ACK message) to the application 60 (step 124).

The VPN client 62 and the VPN server 66 enable network connection processes (e.g., TCP and UDP connection processes) which are superior to the conventional connection process 100 of FIG. 2. The VPN client 62 and the VPN server 66 form a multifaceted system which enables DNS resolution (i.e., hostname to IP address resolution) to be sped up when using a VPN or other type of distributed network. Depending on the utilized VPN protocol's situation on open systems interconnection ("OSI") layers, name routing can happen in at least two ways. Implementing a network level VPN (an "OSI layer 3" VPN), DNS requests from applications 60 on the computing device 12 (i.e., the host machine) are answered by the VPN client 62 via a local resolver 64 which appears to an application 60 to be a local DNS resolver. However, unlike the situation where a DNS resolver is merely run on a client, the local resolver 64 enabled by the VPN client 62 masquerades as a recursive DNS resolver to allow interoperability with the application 60. The local resolver 64 is a fundamental part of a VPN engine enabled by the VPN client 62. Instead of resolving hostnames to IP addresses, the local resolver 64 uses a consistent hashing algorithm, or alternatively a consistent compression algorithm, to assign names within a virtualized address space. The virtualized address space corresponds to an Internet Protocol version 4 ("IPv4") address space (e.g., including assigned name "10.0.0.6") or alternatively an Internet Protocol version 6 ("IPv6") address space (e.g., including assigned name "2002:0220:110C:0230:010A: 04C0:846C:120B"). This allows a nearly instantaneous DNS response from the VPN client 62 to the application 60 in response to a DNS request, since the DNS request is not actually completed, but rather mapped into a virtual address space.

When the application 60 proceeds to open a network connection (such as a TCP or UDP connection) to the virtually resolved address ("virtual address"), the application 60 is allowed to proceed as if such an address exists. The VPN client 62 is enabled to augment the packets sent by the application with information about the originally requested hostname, including for example the hostname itself or portions thereof. The connection proceeds as far as a VPN gateway 68 of the VPN server 66 where the VPN gateway 68 performs a routing transformation on the packets to change the virtual address (e.g., "10.0.0.6" or "2002: 0220.110C:0230:010A:04C0.846C:120B") back to the hostname (e.g., "www.example.com") of a service 74 (e.g., a webpage) hosted on a web/app server 40 targeted by the application 60. The VPN gateway 68 queries an address index 70 to determine an IPV4 address or an IPv6 address corresponding to the hostname. In the case that an IPv4 or an IPv6 address corresponding to the hostname does not exist in the address index 70, the VPN gateway 68 queries a DNS server 72 for an IPV4 or an IPV6 address corresponding to the hostname, during which time the connection is tolled until enough information is available to complete the transformation from the virtual address space back to the real address space necessary for a final connection to be completed. Unlike Network Address Translation (NAT) which relies on numerical routing tables or rules to map addresses in a local network to a public IP address, a hostname is used as the basis of generating a virtual IPv4 or IPv6 address.

In the case where the hostname is long and cannot be represented in an IPV4 or an IPv6 address space, the VPN client 62 augments the connection to the VPN gateway 68 with additional information necessary to fully restore the hashed or compressed hostname into a full hostname on the VPN gateway 68 of the VPN server 66. The additional information, for example, includes the hostname or portion thereof. In the case where the domain name of the hostname is less than approximately 24 characters in length, which is true for a significant number of websites, the hostname is deterministically turned into a representation in the IPv6 address space, or alternatively in the IPv4 address space, and used on its own as the address transmitted to the VPN gateway 68 of the VPN server 66. This has the advantage of reducing overhead because the VPN client 62 does not need to augment the connection request via the VPN tunnel with additional information to restore the hostname, since in such a scenario the hostname can be fully restored from the generated IPv6 address, or alternatively IPv4 address.

Slight variations of implementation may allow a few more or a few less characters in an IPv6 or an IPV4 address. However, in general there is an information density limit to how much information may be carried in an IP address. Therefore, no matter the algorithm chosen, in order to support both shorter and longer hostnames, it is necessary to provide both an option in which the IP address by itself is translatable to a hostname and an option in which additional information is necessary to inform the VPN gateway of the hostname.

Figure 3:
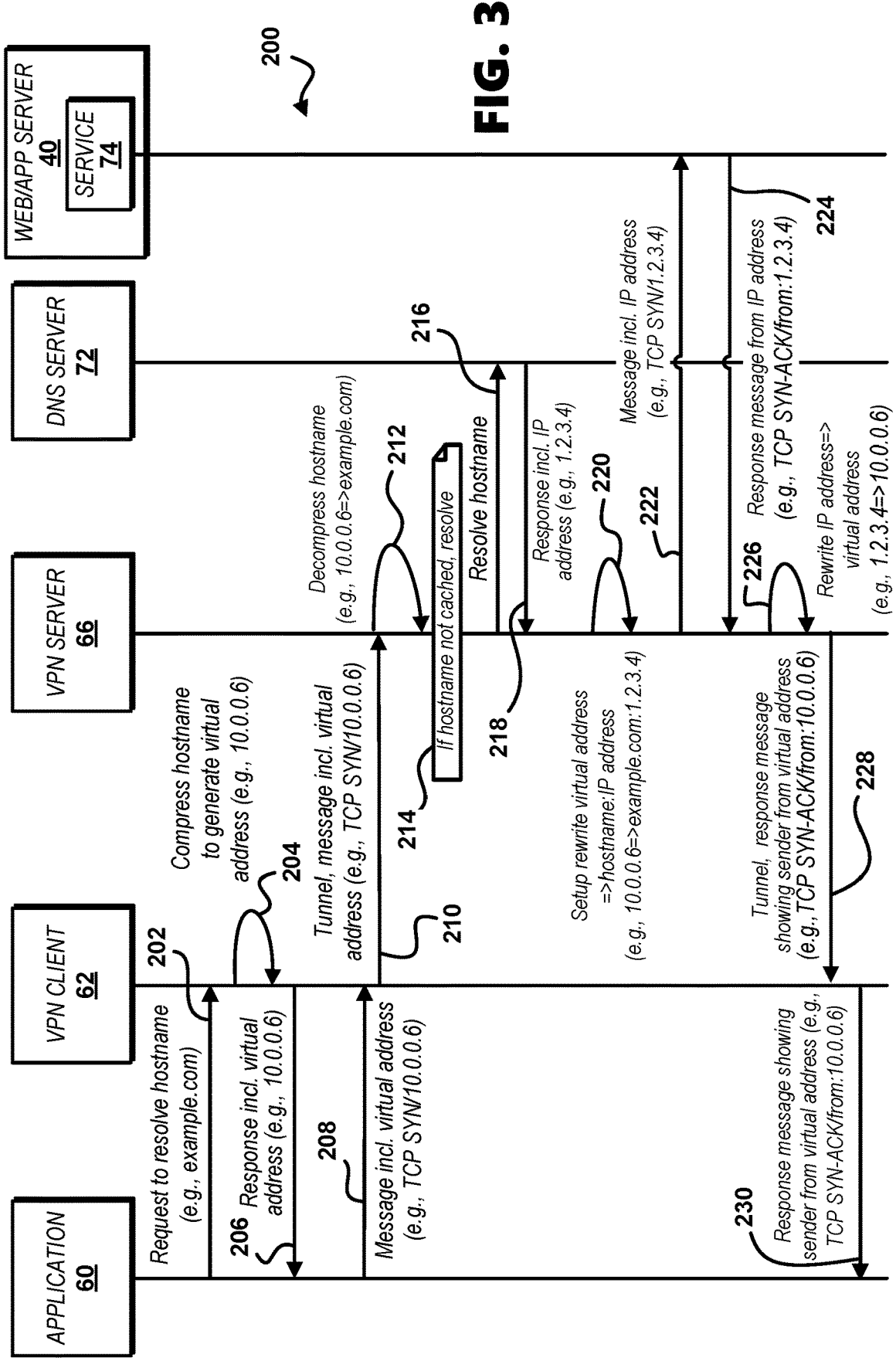
FIGS. 3 and 4 shows network connection processes according to illustrative embodiments of the invention.

Referring to FIG. 3, another network connection process 200 is shown. The process 200 is described with reference to the transmission control protocol ("TCP") communication standard and to the components of the environment 10 including the computing device 12, application 60, VPN client 62, local resolver 64, VPN server 66, DNS server 72, address index 70, web/app server 40, and service 74. Alternatively, the process 200 can be performed via other systems and is not restricted to being implemented by the components of the environment 10. For example, the network connection process 200 can support the user datagram protocol (UDP) communication standard.

In a step 202, the application 60, for example an internet browser, transmits a request to resolve a hostname (e.g., "www.example.com" or "example.com") to the VPN client 62. In a step 204, the VPN client 62 applies a compression algorithm via the local resolver 64 to assign the hostname a virtual address within a virtualized address space (e.g., "10.0.0.6" or "2002:0220:110C:0230:010A:04C0.846C: 120B"). The compression algorithm can for example take the domain name (e.g., example.com) of the hostname as an input excluding the "www" subdomain. Alternatively, the entire hostname (e.g., www.example.com) can be input to the compression algorithm. An example compression algorithm is a hash (e.g., a 64-bit highway hash) with its output bits truncated to the number of available bytes in the virtual address, if required (e.g., in an IPv4 address). Other lossy hashing or compression algorithms can be used. The compression algorithm serves as an indexing function and does not provide a security function or affect the security of the process 200. The VPN client 62 transmits the virtual address (e.g., 10.0.0.6) to the application 60 (step 206).

In a step 208, the application 60 requests a connection (e.g., TCP or UDP connection) to a service 74 (e.g., a webpage) hosted on a web/app server 40 by transmitting a message via the VPN client 62 including the virtual address as if the virtual address were an authentic IP address. In the case of a TCP connection, the application 60 transmits the connection request as a SYN message. The VPN client 62 transmits to the VPN server 66 the message (e.g., the TCP SYN) including the virtual address (e.g., 10.0.0.6) from the application 60 via a VPN tunnel enabled by the VPN client 62 and the VPN server 66 (step 210). In a step 212, the VPN server 66 decompresses the hostname (e.g., www. example.com) by applying a decompression algorithm to the virtual address (e.g., 10.0.0.6) to arrive at the hostname. Particularly, to compute the hostname, the VPN server 66 applies to the virtual address a reverse of the algorithm used by the VPN client to compute the virtual address. In step 210, the VPN client 62 can, if required, augment packets transmitted to the VPN server 66 with information about the originally requested hostname, including for example the hostname itself or portions thereof, which information can be used by the VPN server 66 in computing the hostname.

The VPN server 66 queries the address index 70 to determine if the hostname (e.g., example.com) and its associated IP address are cached therein (step 214). If the hostname and its associated IP address are cached, the process 200 skips steps 216 and 218 and proceeds to step 220. If the hostname and its associated IP address are not cached, the VPN server 66 attempts to resolve the hostname via a DNS request to the DNS server 72 (step 216). In a step 218, the VPN server 66 receives a response from the DNS server 72 including an IP address (e.g., 1.2.3.4). In the step 220, the VPN server 66 performs a rewrite to change the virtual address (e.g., 10.0.0.6) indicated in the message from the application 60 to the actual IP address (e.g., 1.2.3.4) of the web/app server 40 hosting the service 74. The VPN server 66 transmits the rewritten message (e.g., the TCP SYN) to the web/app server 40 hosting the service 74 at the IP address (e.g., 1.2.3.4) (step 222). In the case of a network connection under a UDP communication protocol, the transmission under step 222 is sufficient to initiate a network connection without an acknowledgement from the web/app server 40.

In a step 224, the VPN server 66 receives a response from the web/app server 40, which in the case of a TCP connection includes a synchronize acknowledge ("SYN-ACK") message including an acknowledgement of the sequence number from the VPN server 66 and another sequence number for packets originating from the web/app server 40. In a step 226, the VPN server 66 performs a rewrite to change the actual IP address (e.g., 1.2.3.4) indicated in the message from the web/app server 40 to the virtual IP address (e.g., 10.0.0.6) generated by the VPN client in step 204. The VPN server 66 transmits the rewritten message from the web/app server 40 (e.g., the SYN-ACK message) including the indication of the virtual IP address through the VPN tunnel to the VPN client 62 (step 228). The VPN client 62 transmits the rewritten message from the web/app server 40 (e.g., the SYN-ACK message) including the indication of the virtual IP address to the application 60 (step 230).

In a case where the VPN client 62 integrates with its embedding medium, the application 60, at a transport level (OSI layer 4), for example in a case where the VPN client 62 operates as an extension, plug-in, or add-on merged with the application 60, the local DNS resolution loop of steps 202, 204, 206 are merged. Augmentation can be performed immediately without the need of the local DNS resolution loop of steps 202, 204, 206 since the OSI layer 4 request can be immediately augmented with details including for example the hostname or parts of the hostname. Augmentation included in step 210, if required, is performed to allow for a consistent cache in the address index 70 on the VPN gateway 68.

Figure 4:
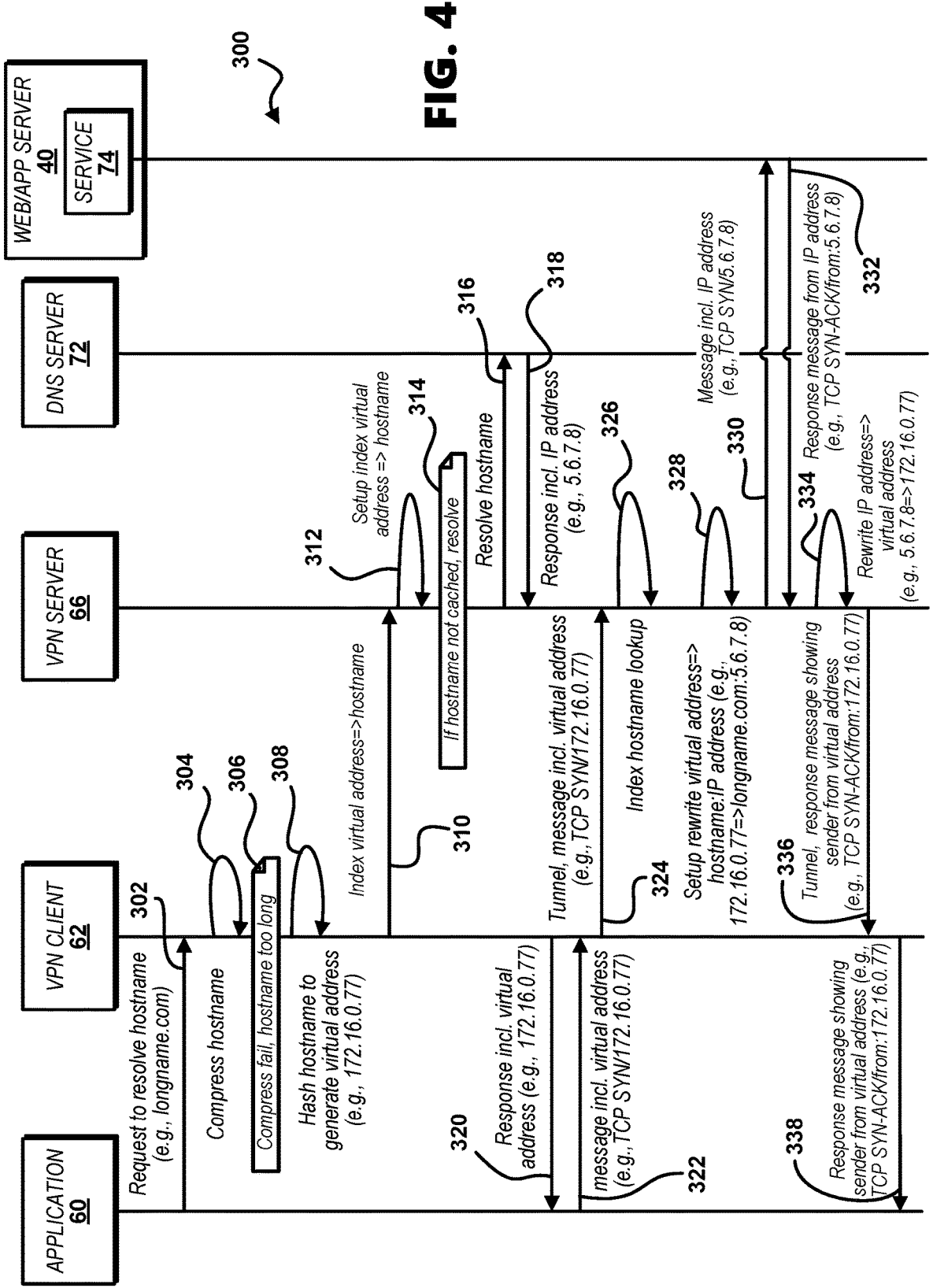

Referring to FIG. 4, yet another network connection process 300 is shown. The process 300 is described with reference to the transmission control protocol ("TCP") communication standard and to the components of the environment 10 including the computing device 12, application 60, VPN client 62, local resolver 64, VPN server 66, DNS server 72, address index 70, web/app server 40, and service 74. Alternatively, the process 300 can be performed via other systems and is not restricted to being implemented by the components of the environment 10.

In a step 302, the application 60, for example an internet browser, transmits a request to resolve a hostname (e.g., "www.longname.com" or "longname.com") to the VPN client 62. In a step 304, the VPN client 62 attempts to apply a compression algorithm via the local resolver 64 to assign the hostname a virtual address within a virtualized address space (e.g., "10.0.0.6" or "2002:0220:110C:0230:010A:04C0:846C:120B"). An example compression algorithm performs a hash (e.g., a 64-bit highway hash) with its output bits truncated to the number of available bytes in the virtual address, if required (e.g., in an IPv4 address). Other lossy hashing or compression algorithms can be used. The compression algorithm serves as an indexing function and does not provide a security function or affect the security of the process 300. In a step 306, the VPN client 62 determines that the compression has failed because the hostname is too long to generate a virtual address in the IPV4 or IPv6 address space. Responsive to determining the compression failed, the VPN client 62 attempts to apply a hashing algorithm via the local resolver 64 to assign the hostname a virtual address (e.g., 172.16.0.77) within a virtualized address space (step 308). The hashing algorithm also performs a hash (e.g., a 64-bit highway hash) with its output bits truncated to the number of available bytes in the virtual address, if required (e.g., in an IPV4 address). The hashing algorithm serves as an indexing function and does not provide a security function or affect the security of the process 300.

The VPN client 62 transmits an indication of the virtual address (e.g., 172.16.0.77) and its associated hostname (e.g., longname.com) to the VPN server 66 (step 310). The VPN server 66 stores the hostname as associated with its virtual address in the address index 70 if the hostname as associated with it virtual address is not already stored in the address index (step 312). The VPN server 66 queries the address index 70 to determine if the hostname (e.g., longname.com) and its associated IP address are cached therein (step 314). If the hostname and its associated IP address are cached, the process 300 skips steps 316 and 318. If the hostname and its associated IP address are not cached, the VPN server 66 attempts to resolve the hostname via a DNS request to the DNS server 72 (step 316). In a step 318, the VPN server 66 receives a response from the DNS server 72 including an IP address (e.g., 5.6.7.8).

The VPN client 62 transmits the virtual address (e.g., 172.16.0.77) to the application 60 (step 320). In a step 322, the application 60 requests a connection (e.g., TCP or UDP connection) to a service 74 (e.g., a webpage) hosted on a web/app server 40 at the virtual address (e.g., 172.16.0.77) by transmitting a message via the VPN client 62 as if the virtual address were an authentic IP address. In the case of a TCP connection, the application 60 transmits the connection request as a SYN message. The VPN client 62 transmits to the VPN server 66 the message from the application 60 including the virtual address over a VPN tunnel enabled by the VPN client 62 and the VPN server 66 (step 324). In a step 326, the VPN server 66 looks up the virtual address (e.g., 172.16.0.77) in the address index 70 to determine the hostname and the IP address associated with the hostname.

In a step 328, based on the lookup performed in step 326, the VPN server 66 performs a rewrite to change the virtual address (e.g., 172.16.0.77) indicated in the message from the application 60 to the actual IP address (e.g., 5.6.7.8) of the web/app server 40 hosting the service 74. The VPN server 66 transmits the rewritten message (e.g., SYN message) to the web/app server 40 hosting the service 74 at the IP address (e.g., 5.6.7.8) (step 330). In the case of a network connection under a UDP communication protocol, the transmission under step 330 is sufficient to initiate a network connection without an acknowledgement from the web/app server 40.

In a step 332, the VPN server 66 receives a response from the web/app server 40 indicating the IP address of the web/app server 40, which in the case of a TCP connection includes a synchronize acknowledge ("SYN-ACK") message including an acknowledgement of the sequence number from the VPN server 66 and another sequence number for packets originating from the web/app server 40. In a step 334, the VPN server performs a rewrite to change the actual IP address (e.g., 5.6.7.8) indicated in the message from the web/app server 40 to the virtual IP address (e.g., 172.16.0.77) generated by the VPN client in step 308. The VPN server 66 transmits the rewritten message from the web/app server 40 (e.g., the SYN-ACK message) including the indication of the virtual IP address through the VPN tunnel to the VPN client 62 (step 336). The VPN client 62 transmits the rewritten message from the web/app server 40 (e.g., the SYN-ACK message) including the indication of the virtual IP address to the application 60 (step 338).

The steps set forth in the process 300 can be performed in orders different from shown. For example, steps 320 and 322 can be performed prior to step 310, and steps 316 and 318 can be performed after step 324. Notwithstanding, step 310 precedes or is performed concurrently with step 324, and step 318 precedes step 328.

In the case where the VPN client 62 integrates with its embedding medium, the application 60, at a transport level (OSI layer 4), for example in a case where the VPN client 62 operates as an extension, plug-in, or add-on merged with the application 60, the local DNS resolution loop of steps 302, 304, 306, 308, 320 are merged. Augmentation can be performed immediately without the need of the local DNS resolution loop of steps 302, 304, 306, 308, 320 since the OSI layer 4 request can be immediately augmented with details including for example the hostname or parts of the hostname. Augmentation included in step 310 is performed to allow for a consistent cache in the address index 70 on the VPN gateway 68.

In an alternative implementation, instead of applying an algorithm to compress or hash a hostname, a counter is used to apply counts to hostnames by the VPN client 62, which counts and their associated hostnames are provided to the VPN gateway 68 of the VPN server 66 and stored in the address index along with their corresponding hostnames. However, a counter-based method will not result in a consistency of addresses between VPN clients 62 on disparate computing devices 12. In this alternative implementation, the VPN gateway 68 keeps a unique routing table for each VPN client 62. On the other hand, by consistently applying a compression or hashing algorithm to a hostname as described in the process 200 or the process 300 for many VPN clients 62 of a particular VPN gateway 68, the work of determining the final address is amortized across the many VPN clients 62, thus increasing system performance.

A first benefit of the processes 200, 300 enabled by the VPN server 66 and the VPN client 62 is the speedup gained by minimizing a DNS query roundtrip segment length. A second benefit is an increase in data privacy. The rate of adoption of encrypted DNS according to studies is stagnating, which would result in loss of privacy in VPN deployments using organization or ISP resolvers circumventing a tunnel. Of course, there may be scenarios where clients perform an encrypted DNS connection, such as DNS-over-HTTPS. In these scenarios the processes 200, 300 are still applicable, however the local resolver 64 would be required to install a client certificate on the computing device 12 (a "pinned certificate") to allow it to appear authorized. Alternatively, in such a scenario the VPN client 62 detects that it does not have a valid certificate for that endpoint and "stands down" by acting as a proxy and not serving the request. A "pinned certificate" or "stand down" scheme can also be applied in the case of domain name system security extensions ("DNSSEC"), although DNSSEC is rare in production scenarios.

The processes 200, 300 enabled by the VPN server 66 and the VPN client 62 help users of computing devices 12 to reach web content, specifically websites, faster with reduced loss of privacy. In particular, users can leave the VPN client 62 enabled on their computing device 12 without suffering from the speed penalty usually inherent in DNS resolution over a VPN tunnel. In a hypothetical connection with a 100 ms Round Trip Time (RTT) between the user of a computing device 12 and the VPN server 66, a minimum of 200 ms of speed improvement is expected in the connection establishment. This speed improvement can be directly seen from the elimination of steps 104 and 110, which transit over a network in the conventional network connection process 100. The corresponding steps 202 and 206 of the network connection process 200 are handled locally, as are steps 302 and 320 of the network connection process 300. Step 310 can be performed asynchronously in the network connection process 300 at any time before step 324. Therefore step 320 is not dependent on the completion of step 310, and in practice step 320 occurs nearly instantaneously after receiving the request to resolve the hostname in step 302. In the more likely scenario of loading a typical web page with multiple domain names being required, and/or domain names that don't fit in a single packet, even greater performance improvement is expected. By the processes described, the number of network crossing requests are reduced from nine (9) to seven (7) in an absolute sense, and since two of those seven are performed directly from the VPN server 66 (e.g., steps 216 and 218 of the process 200) instead of blocking the VPN client 62 (as in steps 106 and 108 of the process 100), the number is reduced to five (5) network crossing calls in a practical sense when establishing a new connection.

Further to the description above and referring to FIGS. 3 and 4, the network connection processes 200, 300 enable a first network connection method. The first network connection method includes receiving by a VPN server 66, from a VPN client 62 operating on a computing device 12, over a VPN connection a first message including a first IP address (steps 210, 310), determining by the VPN server 66 a hostname based on the first IP address (steps 212, 312), resolving by the VPN server 66 the hostname to a second IP address (steps 216, 218, 316, 318), and transmitting by the VPN server 66 the first message to a network device (e.g., the web/app server 40) at the second IP address (steps 222, 330).

The VPN client 62 can apply an algorithm to the hostname or a portion of the hostname to generate the first IP address (steps 204, 304), and the VPN server 66 can apply a reverse of the algorithm to the first IP address to generate the hostname or the portion of the hostname to determine the hostname (step 212).

The first network connection method further includes receiving by the VPN client 62 the hostname (steps 202, 302), assigning by the VPN client 62 the first IP address to the hostname (steps 204, 308), and transmitting by the VPN client 62 the first message including the first IP address to the VPN server 66 (steps 210, 324).

The VPN client 62 can compress the hostname or the portion of the hostname to generate the first IP address (step 204). The VPN server 66 can decompress the hostname or the portion of the hostname based on the first IP address to determine the hostname (step 212).

The VPN client 62 can hash the hostname or a portion of the hostname to generate the first IP address (step 308), and the VPN client 62 can transmit to the VPN server 66 the hostname or a portion of the hostname (step 310). Prior to receiving the first message, the VPN server 66 can receive from the VPN client 62, an indication including the first IP address and the hostname or the portion of the hostname (step 310). The VPN server 66 can store the first IP address in a database based on the indication (step 312), and the VPN server 66 can store the hostname or the portion of the hostname in the database based on the indication (step 312). The VPN server 66 can access the database to determine the hostname based on the first IP address responsive to receiving the first message (step 326).

The first network connection method further includes rewriting by the VPN server 66 the first message (steps 220, 328) to include the second IP address to transmit the first message to the network device (e.g., the web/app server 40) at the second IP address (steps 222, 330). The VPN server 66 receives from the network device a second message including the second IP address as a source address of the second message (steps 224, 332). The VPN server 66 rewrites the second message to include the first IP address as a source of the second message (steps 226, 334), and the VPN server 66 transmits the second message including the first IP address as the source of the second message to the VPN client 62 (steps 228, 336). The first message can include for example a TCP synchronize (SYN) message, and the second message can include for example a TCP synchronize acknowledge (SYN-ACK) message.

In the first network connection method, resolving the hostname includes transmitting by the VPN server 66 a request to a domain name system (DNS) server including the hostname (steps 216, 316) and receiving by the VPN server 66 the second IP address from the DNS server (steps 218, 318).

The first network connection method further includes receiving by the VPN client 62 from an application 60 operating on the computing device 12 a request to resolve the hostname (steps 202, 302), transmitting from the VPN client 62 to the application 60 the first IP address responsive to the request to resolve the hostname (steps 206, 320), and receiving by the VPN client 62 the first message from the application 60 (steps 208, 322). The application 60 can include for example an internet browser. The VPN client 62 operates for example as one or more of an extension, plug-in, or add-on to the application 60.

Further to the description above and referring to FIGS. 3 and 4, the network connection processes 200, 300 enable a second network connection method. The second network connection method includes receiving by a first computing system (e.g., executing the VPN client 62) a hostname (steps 202, 302) and assigning by the first computing system a first IP address to the hostname based on the hostname or a portion of the hostname (steps 204, 308). The first computing system (e.g., via the VPN client 62) transmits over a network a message including the first IP address to a second computing system (e.g., the VPN server 66) (steps 210, 324). The second computing system receives from the first computing system (e.g., via the VPN client 62) the message including the first IP address (steps 210, 324). The second computing system determines the hostname based on the first IP address (steps 212, 326). The second computing system resolves the hostname to a second IP address (steps 216, 218, 316, 318), and the second computing system transmits the message to a third computing system (e.g., the web/app server 40) at the second IP address (steps 222, 330). The first computing system can apply an algorithm to the hostname or a portion of the hostname to generate the first IP address (steps 204, 308), and the second computing system can apply a reverse of the algorithm to the first IP address to generate the hostname or the portion of the hostname to determine the hostname (step 212).

Further to the description above and referring to FIGS. 3 and 4, the network connection processes 200, 300 enable a computing system (e.g., the VPN server 66). The computing system includes one or more processors and memory storing executable instructions that, as a result of being executed, cause the system to perform operations including receiving from a VPN client 62 operating on a computing device 12 over a VPN connection a first message including a first IP address (steps 210, 324). The operations further include determining a hostname based on the first IP address (steps 212, 326), resolving the hostname to a second IP address (steps 216, 218, 316, 318), and transmitting the first message to a network device (e.g., the web/app server 40) at the second IP address (steps 222, 330).

The operations further include rewriting the first message (steps 220, 328) to include the second IP address to transmit the first message to the network device at the second IP address (steps 222, 330). The operations further include receiving from the network device, a second message including the second IP address as a source address of the second message (steps 224, 332), rewriting the second message to include the first IP address as a source of the second message (steps 226, 334), and transmitting the second message including the first IP address as the source of the second message to the VPN client 62 (steps 228, 336).

Figure 5:
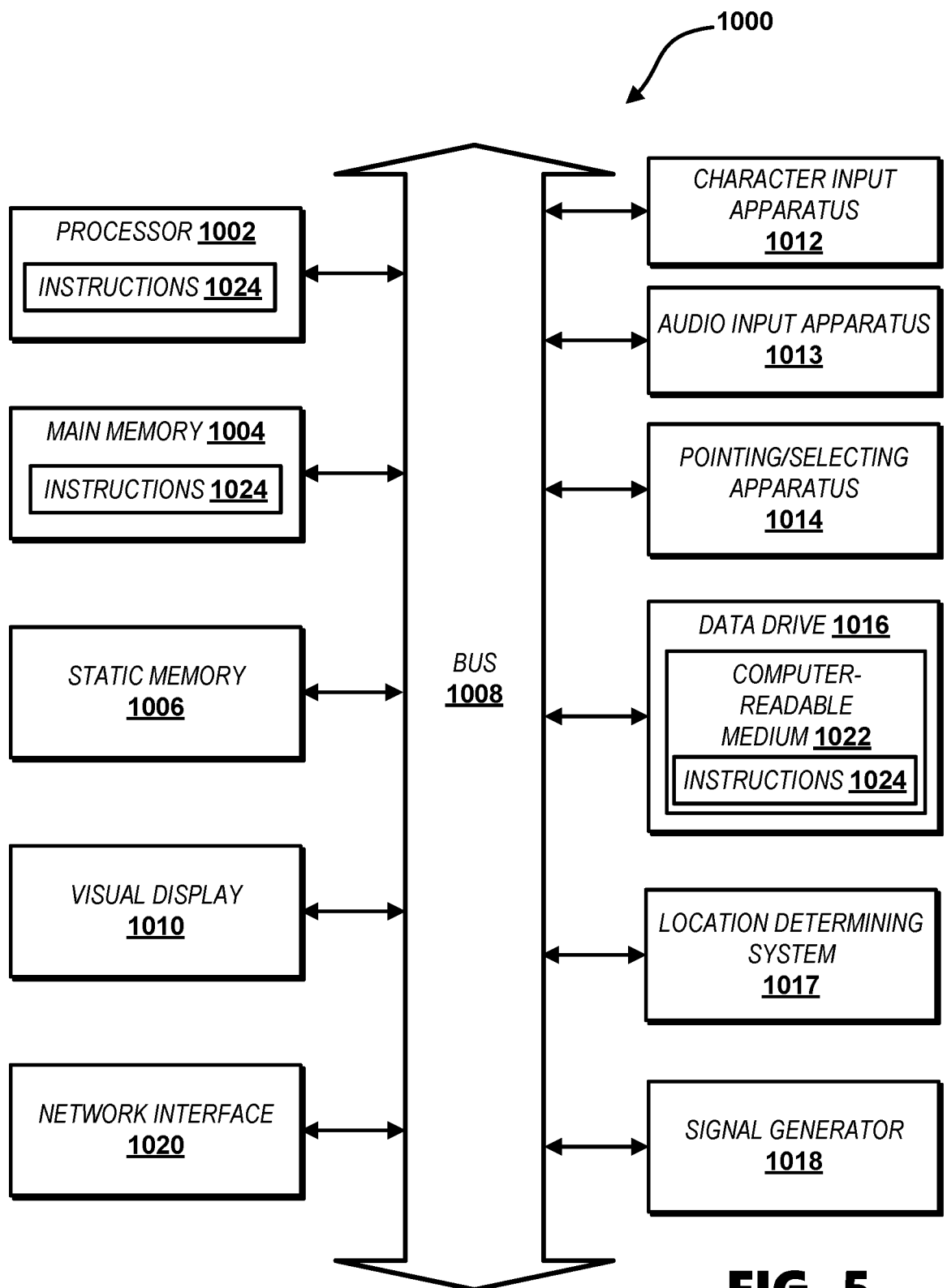
FIG. 5 shows a computer system for performing described methods according to illustrative embodiments.

FIG. 5 illustrates in abstract the function of an exemplary computer system 1000 on which the systems, methods and processes described herein can execute. For example, the computing device 12, VPN server 66, web/app servers 40, and DNS server 72 can each be embodied by a particular computer system 1000 or a plurality of computer systems 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010, for example a liquid crystal display (LCD), a light emitting diode (LED) display, or a cathode ray tube (CRT) is provided for displaying data to a user of the computer system 1000. The visual display 1010 can be enabled to receive data input from a user, for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a computer network, for example the computer network 8, using a signal transmission medium via the network interface 1020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Implementations of the herein described processes may require or benefit from the repeated application of the herein described processes, and each application of a process can be run independently from another without any coordination required between the applications of the processes. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A network connection method comprising:
    receiving a hostname by a VPN client operating on a computing device;
    applying by the VPN client an algorithm to the hostname or a portion of the hostname to compress the hostname or the portion of the hostname to generate a first IP address;
    transmitting by the VPN client a first message including the first IP address to a VPN server;
    receiving by the VPN server, from the VPN client, over a VPN connection the first message including the first IP address;
    applying by the VPN server a reverse of the algorithm to the first IP address to generate the hostname or the portion of the hostname to determine the hostname;
    resolving by the VPN server the hostname to a second IP address; and
    transmitting by the VPN server the first message to a network device at the second IP address.

2. The method of claim 1, further comprising decompressing by the VPN server the hostname or the portion of the hostname based on the first IP address to determine the hostname.

3. A network connection method comprising:
    receiving a hostname by a VPN client operating on a computing device;
    hashing by the VPN client the hostname or a portion of the hostname to generate a first IP address;
    transmitting by the VPN client to a VPN server the hostname or the portion of the hostname;
    transmitting by the VPN client a first message including the first IP address to the VPN server;
    receiving by the VPN server, from the VPN client, over a VPN connection the first message including the first IP address;
    determining by the VPN server the hostname based on the first IP address;
    resolving by the VPN server the hostname to a second IP address; and
    transmitting by the VPN server the first message to a network device at the second IP address.

4. The method of claim 3, further comprising:
receiving by the VPN server from the VPN client, prior to receiving the first message, an indication including the first IP address and the hostname or the portion of the hostname;
storing by the VPN server the first IP address in a database based on the indication;
storing by the VPN server the hostname or the portion of the hostname in the database based on the indication; and
accessing by the VPN server the database to determine the hostname based on the first IP address responsive to receiving the first message.

5. A network connection method comprising:
receiving by a VPN server, from a VPN client operating on a computing device, over a VPN connection a first message including a first IP address;
determining by the VPN server a hostname based on the first IP address;
resolving by the VPN server the hostname to a second IP address;
rewriting by the VPN server the first message to include the second IP address; and
transmitting by the VPN server the first message to a network device at the second IP address.

6. The method of claim 5, further comprising:
receiving by the VPN server, from the network device, a second message including the second IP address as a source address of the second message;
rewriting by the VPN server the second message to include the first IP address as a source of the second message; and
transmitting by the VPN server the second message including the first IP address as the source of the second message to the VPN client.

7. The method of claim 6, wherein:
the first message comprises TCP synchronize (SYN) message; and
the second message comprises a TCP synchronize acknowledge (SYN-ACK) message.

8. The method of claim 5, wherein resolving the hostname comprises:
transmitting by the VPN server a request to a domain name system (DNS) server including the hostname; and
receiving by the VPN server the second IP address from the DNS server.

9. The method of claim 5, further comprising:
receiving by the VPN client from an application operating on the computing device a request to resolve the hostname;
transmitting from the VPN client to the application the first IP address responsive to the request to resolve the hostname; and
receiving by the VPN client the first message from the application.

10. The method of claim 9, wherein the application comprises an internet browser.

11. The method of claim 9, wherein the VPN client operates as at least one of an extension, plug-in, or add-on to the application.

12. The method of claim 1, wherein the first message comprises a TCP synchronize (SYN) message.

13. A network connection method comprising:
receiving by a first computing system a hostname;
assigning by the first computing system a first IP address;
transmitting over a network by the first computing system a message including the first IP address to a second computing system;
receiving by the second computing system from the first computing system the message including the first IP address;
determining by the second computing system the hostname based on the first IP address;
resolving by the second computing system the hostname to a second IP address;
rewriting by the second computing system the message to include the second IP address; and
transmitting by the second computing system the message to a third computing system at the second IP address.

14. The network connection method of claim 13 further comprising:
applying by the first computing system an algorithm to the hostname or a portion of the hostname to generate the first IP address; and
applying by the second computing system a reverse of the algorithm to the first IP address to generate the hostname or the portion of the hostname to determine the hostname.

15. A system comprising:
one or more processors; and
memory storing executable instructions that, as a result of being executed, cause the system to perform operations comprising:
receiving from a VPN client operating on a computing device over a VPN connection a first message including a first IP address;
determining a hostname based on the first IP address;
resolving the hostname to a second IP address;
rewriting the first message to include the second IP address to enable transmitting the first message to a network device at the second IP address; and
transmitting the first message to the network device at the second IP address.

16. The system of claim 15, the executable instructions, as a result of being executed, further causing the system to perform operations comprising:
receiving from the network device, a second message including the second IP address as a source address of the second message;
rewriting the second message to include the first IP address as a source of the second message; and
transmitting the second message including the first IP address as the source of the second message to the VPN client.

* * * * *